(12) United States Patent
Borovik et al.

(10) Patent No.: US 6,380,276 B1
(45) Date of Patent: *Apr. 30, 2002

(54) METAL COMPLEXES IMMOBILIZED IN POROUS ORGANIC HOSTS

(75) Inventors: Andrew Borovik; Anjal Sharma, both of Lawrence, KS (US); John Krebs, Evanston, IL (US)

(73) Assignee: The University of Kansas, Lawrence, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,247

(22) Filed: Jan. 12, 1999

(51) Int. Cl.⁷ ................................. C08J 9/00; C08J 9/28
(52) U.S. Cl. ......................... 521/153; 521/64; 210/656
(58) Field of Search .......................... 210/656; 521/153, 521/64

(56) References Cited

U.S. PATENT DOCUMENTS

| 4,888,032 | A | * | 12/1989 | Busch | 99/44 |
| 5,376,690 | A | | 12/1994 | Newkome et al. | 521/53 |
| 5,905,126 | A | * | 5/1999 | Tomotsu | 526/153 |
| 5,945,079 | A | * | 8/1999 | Ekiriwang et al. | 423/219 |
| 5,955,419 | A | * | 9/1999 | Barket, Jr. et al. | 510/507 |
| 6,048,830 | A | * | 4/2000 | Gallon et al. | 510/349 |

* cited by examiner

Primary Examiner—Morton Foelak
(74) Attorney, Agent, or Firm—Hovey, Williams Timmons & Collins

(57) ABSTRACT

Polymer-metal ion composites and methods are provided for reversibly binding target compounds using such composites. Broadly, the composites comprise an amorphous polymer matrix having a plurality of channels with metal ion-ligand complexes immobilized therein. The composites are formed by polymerizing a polymeric moiety with a metal complex template in the presence of a solvent. The template is formed of a metal ion having a ligand bonded thereto as well as to polymer matrix. The metal ion and ligand are selected to yield a composite having a particular chemical and/or physical environment around the metal sites, depending upon the desired end use. Preferred metal ions include ions of the transition metals. The composites can be contacted with target compounds for reversibly binding the compounds. Exemplary compounds include those selected from the group consisting of oxygen, carbon monoxide, carbon dioxide, compounds having an atom of P, S, or N, and mixtures thereof. The compound can be released from the composites at the desired time and location by heating the compound-containing composite.

9 Claims, 5 Drawing Sheets

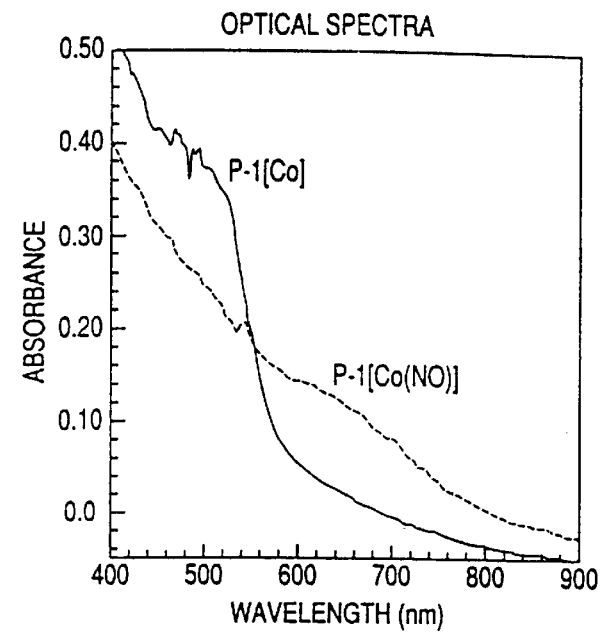
Fig. 6.
Fig. 7.
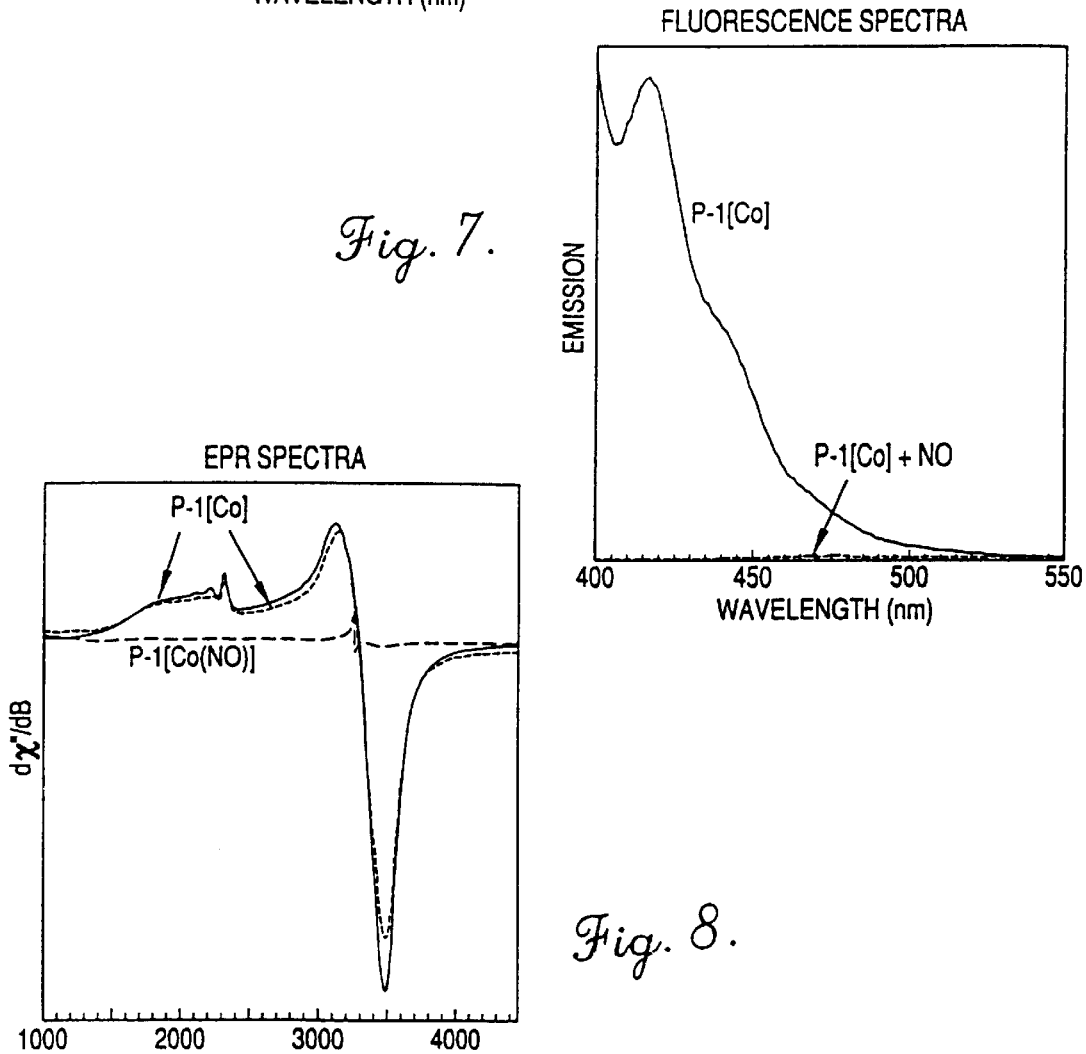
Fig. 8.

METAL COMPLEXES IMMOBILIZED IN POROUS ORGANIC HOSTS

BACKGROUND OF THE INVENTION

1. Field of the Invention

The present invention is broadly concerned with polymer-metal ion composites and methods for reversibly binding target compounds using such composites. More particularly, the invention pertains to stable composites comprising an amorphous polymer matrix having a plurality of channels with metal ion-ligand complexes immobilized therein. The metal complexes include a metal ion, preferably an ion of a transition metal, having a ligand bonded to the metal ion and the polymer matrix. The metal complexes are dispersed within the polymer matrix so that the metal ions are preferably at least about 8 Å apart. The composites are formed by polymerizing a polymeric moiety with a metal-ion ligand complex template in the presence of a solvent. The template preferably further includes a spacer ligand which is selected based upon its size or properties and which can be removed after polymerization to yield a composite having a particular chemical and/or physical environment around the metal sites. In the methods of the invention, the composites are contacted with a target compound under conditions for binding the compound. The composites and methods are particularly useful for reversibly binding compounds selected from the group consisting of oxygen, carbon monoxide, carbon dioxide, compounds having an atom of P, S, or N, and mixtures thereof.

2. Description of the Prior Art

The function of metal ions in biomolecules is controlled by two interrelated structural features: the structure of the metal ion coordination sphere which includes the geometric relationship of metal-bound ligands; and the molecular architecture of the metal binding site that controls the secondary coordination sphere (or microenvironment) about the metal ion. While the role of the former is well known in directing the activity of metalloproteins, the importance of the latter cannot be overlooked. Microenvironments about the metal ion active sites which are induced by the protein structure regulate several properties, including hydrophobicity, polarity, electrostatics, solvation, and the dielectric constant. Furthermore, the morphology of the metal active site in metalloproteins can govern the accessibility of substrates by the metal ions. Protein-created microenvironments thus have a significant role in controlling the reactivity of the metal ions.

The effects of the microenvironment on the functions of metal ions in proteins is illustrated by the diverse activity of heme-containing proteins. (Dawson, J. H., *Science*, Vol. 240, p. 433, (1988); Ortiz de Montellano, P. R., *Acc. Chem. Res.*, Vol. 20, p. 289, (1987)). In hemoglobin and myoglobin, the steric constraints and hydrogen bonding capacity of the distal side of the heme pocket has a significant effect on the oxygen binding properties of these proteins. (Suslick, K. S. et al., *J. Chem. Educ.*, Vol. 62, p. 974, (1985)). In the oxygenases and peroxidases, the functions of enzymes are affected greatly by the various protein environments that house the catalytic iron heme moieties. For example, cytochrome $p_{450}$ (a monooxygenase) and chloroperoxidase (which halogenates substrates) have identical heme active sites with axially bound thiolates, yet their functions are vastly different. (Dawson, J. H., *Science*, Vol. 240, p. 433, (1988)).

Protein structure also controls other properties necessary for metal ions to fiction in biomolecules. In most cases, the active sites are located within the interior of the proteins, isolated from each other to prevent undesirable interactions. For example, in human hemoglobin the four heme dioxygen binding sites are isolated from each other by the globin, and the closest distance between heme sites is 25 Å. (Perutz, M. F. et al., *Acc. Chem. Res.*, Vol 20, p. 309, (1987)). This is imperative for reversible $O_2$ binding because if the heme sites were allowed physical contact, either by intra or intermolecular pathways, the four-electron auto-oxidation of $O_2$ would occur, leading to thermodynamically stable $\mu$-oxo bridge iron species. In hemoglobin, like many metal ion-containing proteins, access by external ligands to the metal sites is provided by channels that connect the active sites to the surface of the proteins. The channel structure, while providing a means of entry into the active sites, can also aid in orienting substrates as they approach the metal ion as well as assist in the selection of substrates.

In the past, there has been great interest in developing synthetic systems that mimic the structural, physical, and functional properties of the metal ion sites found in proteins. (Ibers, J. A. et al., *Science*, Vol. 209, p. 223, (1980); Karlin, K. D. *Science*, Vol. 261, p. 701, (1993)). One approach to examine the role of microenvironments in the functions of metal ions within proteins is to simulate various architectural features in low molecular weight systems. (Karlin, K. D., *Science*, Vol. 261, p. 701, (1993)). Design features found in proteins have been incorporated into organic ligand systems to help direct the chemistry at the metal centers in solution. The reversible binding of $O_2$ to synthetic iron porphyrin is one example where the design of organic ligands can dictate the reaction chemistry at a distant metal site. (Suslick, K. S. et al., *J Chem Educ.*, Vol. 62, p. 974, (1985); Momenteau, M. et al., *Chem. Rev.*, Vol. 94, p. 659, (1994)). The picket-fence iron porphyrin of Collman was the first synthetic heme to reversibly bind $O_2$ in solution at room temperature by preventing the intermolecular iron oxygen interactions that lead to M-oxo bridge iron species. (Collman, J. P., *Acc. Chem. Res.*, Vol. 10, p.265, (1977)). A variety of other porphyrins and non-porphyrin ligands have since been designed containing cavity motifs that, when metallated with iron, are capable of forming $Fe-O_2$ adducts. (Suslick, K. S. et al., *J. Chem Educ.*, Vol. 62, p. 974, (1985); Momenteau, M. et al., *Chem. Rev.*, Vol. 94, p. 659, (1994); Jones, R. D. et al., *Chem. Rev.*, Vol. 79, p. 139, (1979); Busch, D. H. et al., *Chem. Rev.*, Vol. 94, p. 585, (1994)). In addition, other notable examples where ligand design has aided in mimicking biological function in synthetic systems include: the specific recognition of metal ions; (Cram, D. J., *Angew. Chem., Int. Ed. Engl.*, Vol. 27, p. 1009, (1988); Lehn, J. M., *Angew. Chem., Int. Ed. Engl.*, Vol.27, p. 89, (1988); Pedersen, C. J., *Angew. Chem., Int. Ed. Engl.*, Vol. 27, p. 1021, (1988)) the acceleration of the rates of chemical reactions; (Breslow, R., *Science, Vol.* 218, p. 532, (1982)) and in artificial receptors that show strong and selective binding of organic substrates (Hamilton, A. J., *Chem. Educ.* Vol.67, p.821, (1990); Diederich, F. J., *Chem. Educ.* Vol. 67, p. 813, (1990); Tjivikua, T. et al., *J. Am. Chem. Soc.* Vol. 112, p. 1250, (1990); Webb, T. H. et al., *J Am. Chem. Soc.*, Vol 113, p. 8554, (1991)). Finally, template copolymerization methods have been used extensively to generate systems that selectively bind analytes. Wutff, G., *Angew. Chem., Int. Ed. Engl.*, Vol. 34, p. 1812 (1995); Mosbach, K., Trends Biotech., Vol. 19, p. 9 (1994); Shea, K. J., *Trends Poly. Sci.*, Vol. 2, p. 166 (1994). In most cases, these molecular systems use a combination of morphological control of a binding cavity and weak bonding interactions to guide the recognition process.

Another approach simulating the site isolation properties of metalloproteins is to attach synthetic metal complexes onto the surface of solid supports. For example, embedding the diethyl ester of heme in a hydrophobic matrix of polystyrene and 1-(2 phenylethyl)-imidazole permits the Fe(II) sites of the heme to reversibly bind $O_2$ (Wang, J. H., *J. Am. Chem. Soc.*, Vol. 80, p. 3168, (1958); Wang, J. H., *Acc. Chem. Res.*, Vol. 3, p. 90, (1970)). It has also been reported that crosslinked polystyrene containing attached imidazole ligands can coordinate Fe(II) tetraphenylporphyrin ($Fe^{II}$TPP). (Collman, J. P. et al., *J. Am. Chem. Soc.*, Vol. 95, p. 2048, (1973)). However, this matrix is too flexible (or the sites are not sufficiently dispersed throughout the matrix) to prevent the formation of($Fe^{III}$TPP)$_2$O. In a related system, $Fe^{II}$TPP has been attached to a rigid silica gel support that was modified with 3-imidazolylpropyl groups. (Leal, O. et al., *J. Am. Chem. Soc.*, Vol. 97, p. 5125, (1975)). Reversible $O_2$ binding to the Fe sites was observed, but that binding was weak. At −127° C., the binding was irreversible and a $P_{1/2}(O_2)$ of 230 torr was measured at 0° C. The estimated $P_{1/2}(O_2)$ for hemoglobin at 0° C. is 0.14 torr.

Other types of matrices have been used to immobilize metal complexes for the purpose of reversible binding of $O_2$, including the encapsulation of iron porphyrins in dendrimer cages (Aida, T. et al., *Chem. Commun.*, Vol. 1, p. 1523, (1996); Collman, J. P. et al., *Chem. Commun.*, Vol.2, p.193, (1997)) and membranes, (Tsuchida, E. et al., *J. Chem. Soc., Dalton Trans.*, p. 2465, (1993)) as well as the immobilization of cobalt Schiff base complexes in zeolite cages. (Howe, R. F. et al., *J. Phy. Chem.*, Vol. 75, pg 1836, (1975); Herron, N., *Inorg. Chem.*, pg. 4714, (1986); De Vos, D. E. et al., *J. Am. Chem. Soc.* Vol.116, pg 4746, (1994). The dendrimer porphyrins have the ability to stabilize Fe—$O_2$ adducts. (Diederich, F. J., *Chem. Educ.* Vol. 67, p. 813, (1990); Aida, T. et al., *Chem. Commun.*, Vol. 1, p. 1523, (1996); Collman, J. P. et al., *Chem. Commun.*, Vol. 2, p. 193, (1997)). The zeolite systems use a "ship in the bottle" protocol to assemble the Co(II) Schiff base complexes inside zeolite cages. The limitations of this technique are in the difficulty of matching the size and shape of the metal complex to that of the preformed cage as well as the inability of external gases to access the metallated sites within the interior of the zeolite. While, reversible binding has been observed in these systems, the quantity of Co sites involved in the binding is generally less than 25%. (Tsuchida, E. et al., *J. Chem. Soc., Dalton Trans.*, p. 2465, (1993)). Thus, these prior art systems do not sufficiently isolate the metal sites from each other, and they generally utilize only a small percentage of the metal sites in the binding of the target compound.

SUMMARY OF THE INVENTION

The instant invention overcomes these problems by providing stable composites comprising immobilized metal complexes in porous polymeric hosts useful for reversibly binding target compounds. In more detail, the composites of the invention comprise an amorphous polymer matrix which includes a substitution-inert metal complex comprising a metal ion bonded to a ligand which in turn is bonded to the backbone of the matrix.

Preferably, the composites have a plurality of spaced-apart metal complexes and a plurality of channels throughout the polymer matrix for allowing the target compounds to access the metal sites.

Advantageously, the metal ions are used to organize the desired functional groups within the polymer around the metal ion. The metal ion of the complex is preferably an ion of a transition metal, such as an ion of Co(III). The metal complexes should be spaced apart within the polymer matrix at such a distance that at least about 50%, preferably at least about 70%, and more preferably at least about 80% of the metal ions are at least about 8 Å from any other metal ion in the composite. In one embodiment, the metal ions are arranged within the polymer matrix so that at least about 50%, preferably at least about 70%, and more preferably at least about 80% of the metal ions are at least about 12 Å from any other metal ion. The channels within the polymer matrix preferably have an average diameter of from about 60–120 Å, and more preferably from about 80–100 Å.

While any polymeric moiety (monomer, dimer, trimer, oligomer, etc.) which produces rigid, crosslinked polymers when heated or exposed to light is suitable for forming the polymer matrix of the composites, the preferred moieties are organic and include a vinyl group. Particularly preferred polymeric moieties are those selected from the group consisting of divinyl benzene, dimethacrylates, diacrylamides, and mixtures thereof If necessary, an initiator, such as azobisisobutyronitrile (AIBN), may also be used with the polymeric moiety in order to generate a free radical reaction.

The composites of the invention should include from about 5–20% by weight metal ion, and preferably from about 3–7% by weight, based upon the total weight of the composite taken as 100% by weight. Preferably, the composites include from about 80–97% by weight of the combination of polymer matrix and ligands, and preferably from about 90–97% by weight, based upon the total weight of the composite taken as 100% by weight.

The ligand moiety of the metal complex should be covalently bonded to the metal ion and covalently bonded to the polymer matrix. Preferably, the portion of the ligand bonded to the polymer matrix comprises a vinyl group, with a particularly preferred ligand being a styrene-modified salen ligand. During polymerization, the composites further include "spacer" ligands. After polymerization, these spacer ligands can remain in the composite or can be removed from the metal complex to yield the desired architecture around the metal site. Those skilled in the art will appreciate that these spacer ligands can be chosen to have particular properties or sizes so that the positioning of the polymer matrix and of the functional, non-spacer ligands within the polymer matrix is controlled. Furthermore, the metal ion used during polymerization can be removed and replaced with a different metal ion depending upon the desired binding properties of the polymer. The spacer ligand is covalently linked to the metal ion but not bonded to the polymer matrix. The stability constant (as determined spectrophotometrically at room temperature) of the spacer ligand bonded to the metal ion is from about $10^2$–$10^{30}$ $M^{-1}$, and preferably from about $10^7$–$10^{20}$ $M^{-1}$. A preferred spacer ligand is a dimethylaminopyridine ligand.

The methods of forming the composites of the invention are schematically depicted in FIG. 1. A substitution inert metal complex template having the desired ligands attached thereto (including both the functional, non-spacer ligands as well as the spacer ligands, the latter of which will generally be removed to provide the desired architecture around the metal ion) is attached to the metal ion. The template is then polymerized with a polymeric moiety (such as divinyl benzene, dimethacrylates, or diacrylamides) in the presence of a porogenic agent (solvent) capable of dissolving the moiety monomers before polymerization, thus forming the plurality of channels within the polymer matrix. Some preferred solvents include methanol and dimethylforamide (DMF). The spacer ligands can then be removed by exposing the composites to a suitable chelating agent (such as cyanide or EDTA) which will break the bonds between the metal ion and the functional groups which are bonded to the polymer matrix, thus removing the metal ion and the spacer ligands. The same metal ion or a different metal ion can then be returned to the site without the spacer ligands. One suitable way of returning the metal ion is by way of a metal salt along with a solvent for that salt. The resulting composite is then preferably formed into a particle size of from about 75–125 μm, depending upon the particular application. FIG. 2 schematically depicts the final formed composite with the metal ions 10 dispersed within the polymer matrix 12 and bound to the matrix by ligands 14.

In accordance with the methods of the invention, the composites can be used to bind target compounds by contacting the composites with the target compound under conditions for binding that compound. Preferably, the contacting step is carried out under ambient conditions. The target compound can then be removed from the composite by heating the compound-containing composite, preferably to a temperature of about 120° C. The contacting step results in at least about 50%, and preferably at least about 80%, of the metal ions of the composite having a target compound bound thereto. When stored in an ambient environment, at least about 50%, and preferably at least about 80%, of the metal ions having a target compound bound thereto during said contacting step will still have a target compound bound thereto after about 7 days.

Target compounds which can be bound by the composites include those selected from the group consisting of oxygen, carbon monoxide, carbon dioxide, compounds having an atom of P, S, or N, and mixtures thereof The instant invention is particularly useful for reversibly binding NO and oxygen. Thus, the composites of the invention can be used to remove NO generated from the combustion of fossil fuels. Furthermore, upon the binding of NO with the composite, the color of the material changes from orange to green, making the composites suitable for use in NO sensor technology. The development of NO sensors is important in probing the biological functions of NO which is both a vasodilatory messenger and an endothelial-derived relaxing factor and plays a key role in cellular communication. With modification of the polymeric surface of the composites, they can be attached to an optical fiber for in vivo NO detection in the presence of other gaseous analytes.

BRIEF DESCRIPTION OF THE DRAWINGS

FIG. 6 is a graph showing the diffuse reflectance optical spectra for a composite of the invention compared to the diffuse reflectance optical spectra of the same composite with NO bonded to the Co ion;

FIG. 7 is a graph illustrating the fluorescence spectra for a composite of the invention compared to the fluorescence spectra of the same composite with NO bonded to the Co ion; and FIG. 8 is a graph demonstrating the reversibility of NO binding to a composite of the invention by comparing the EPR spectra taken prior to NO binding, with NO bound to the composite, and after the removal of NO.

DETAILED DESCRIPTION OF THE PREFERRED EMBODIMENTS

Figure 1:
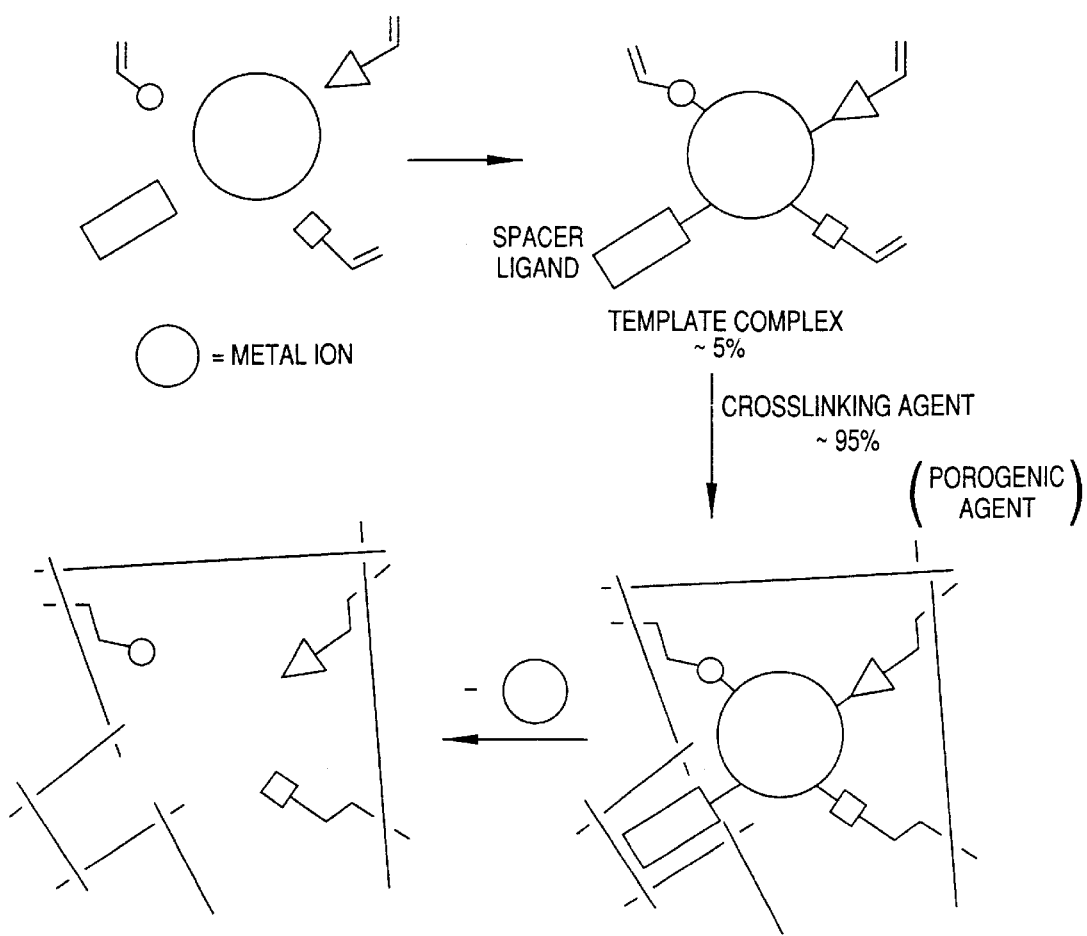
FIG. 1 is a schematic illustration depicting the general process by which the composites of the invention are formed.
Figure 2:
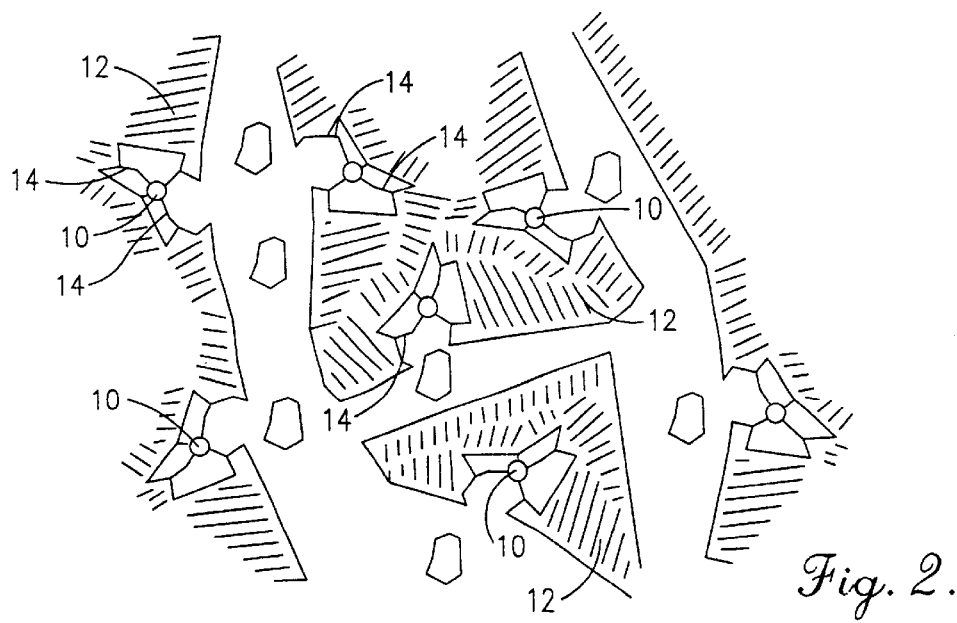
FIG. 2 is a schematic depiction showing the dispersion of the metal complexes and channels throughout the polymer matrix in the composites of the invention.

The following examples set forth preferred methods in accordance with the invention. It is to be understood, however, that these examples are provided by way of illustration and nothing therein should be taken as a limitation upon the overall scope of the invention.

EXAMPLE 1

Material and Methods
1. Solvent and Liquid Reagents

Solvents and reagents used for synthesis or sample preparations were dried as follows: methanol (Fisher Chemical Co.) was distilled over $CaH_2$ under nitrogen; 4-vinyl pyridine (Aldrich Chemical Co.) was purified by distillation under nitrogen, followed by degassing by five freeze-pump-thaw cycles; 4-dimethylaminopyridine (Aldrich Chemical Co.) was purified by sublimation under vacuum; cobalt acetate tetrahydrate (Fisher Chemical Co.) was dehydrated by heating to 120° C. under vacuum for 48 hours; and dioxygen was dried over molecular sieves and anhydrous $CaCl_2$.

2. Preparation of the EPR (Electron Paramagnetic Resonance) Spin Quantification Standard A mixture containing cupric acetylacetonate (0.0153 g, 0.0585 mmol) and 0.0870 g of the host-only polymer (hereinafter referred to as "P-1") was ground down in a Wig-L-Bug for three minutes, followed by immersion of the ground mixture in liquid nitrogen for 30 seconds and further homogenization on the Wig-L-Bug for three minutes. This cycle was repeated two more times. A light blue powder (0.102 g and 15% by weight cupric acetylacetonate, based upon the polymer taken as 100% by weight) was obtained.

3. Preparation of Polymer Samples for EPR Spectroscopy

All samples were prepared in a drybox under argon. Generally, 15–25 mg of each sample was used. The polymer samples were directly weighed out into the EPR tube (3 mm outer diameter and 2 mm internal diameter, Supracil quartz, Wilmad). For solid samples, the EPR tubes were capped with a septum, and parafilm was wrapped around the septum and tube. For samples with a suspending solvent (such as ether), the samples were initially weighed out in the EPR tube followed by the addition of about 0.5 ml of the solvent. A septum was used to cap the tube and parafilm was wrapped around the septum and tube. A typical oxygenation procedure involved insertion of a long thin-bore needle through the septum to just above the polymer bed. The sample was then purged with oxygen for 30 minutes, and the polymer was allowed to settle. A similar procedure was followed for purging with nitrogen.

4. Instrumental Analyses

NMR Spectra were recorded on either a Varian UNITY plus-400 MHz spectrometer equipped with a Sun workstation, or on a Bruker DRX400 instrument equipped with an SGI INDY workstation. Mass spectra were collected on a VG analytical limited VG-ZAB FAB-MS instrument. IR spectra were collected either on a Mattson Sirius 100 FTIR instrument (with the 4326 upgrade) or on a Mattson Genesis Series FTIR instrument. UV-vis spectra were collected on a SLM Aminco 3000 diode array spectrophotometer using 1.0 cm Supracil quartz cuvettes.

Infrared Diffuse Reflectance Spectra were collected using a Mattson Genesis Series FTIR instrument interfaced with an external bench housing a Harrick Scientific diffuse reflectance accessory (DRA-PMI) and with a liquid nitrogen-cooled MCT narrow band detector. The reference material was KBr. The spectra were collected in single beam form using 4 cm$^{-1}$ resolution, 512 scans, and gain=1. The spectra were then converted to Kubelka-Munk units using KBr as the reference material.

GC-MS analyses were performed using an HP 6890 chromatograph coupled with a mass selective detector HP 6890. Chromatographic analyses were carried out on an BP 5890 Series II chromatograph.

Scanning Electron Micrographs were collected on a Hitachi S-570 SEM equipped with a LaB$_6$ filament. The samples for the SEM analyses were prepared by coating a clean Cambridge sample stub with a carbon graphite paint. The polymer, sieved to particle sizes of 250–500 µm, was then sprinkled onto the paint and the excess polymer particles were shaken off. The sample was dried in an oven at 65° C. for 4 hours. It was then sputter-coated with a 10 nm thick Au—Pd (60:40) alloy coat by using a Hummer-2 operating at 130 torr and 10 Stamps. The samples were scanned using an accelerating voltage of 3.0 kV. Surface area analyses of the polymers were performed on a Gemini surface area microanalyzer operating at 77° K. Typical sample sizes ranged from 0.12–0.16 g, with polymer particle sizes of 75–125 µm.

EPR (electron paramagnetic resonance) spectra were collected using a Bruker ESP-300 E instrument with a TE$_{102}$ cavity previously calibrated using DPPH. The spectra for the Co(II) samples were collected using the following instrument settings: mode=EPR; baseline correction=on; attenuation=25 dB; microwave power=0.63 mW; frequency=9.21 GHz; center field=2480 G; sweep width= 4900 G; modulation amplitude=5.02 Gpp; gain=5.0×10$^{-3}$; conversion time=40.96 ms; time constant=1.28 ms; resolution=1024 points; and average number of scans=4. The Cu standard spectrum was collected for each sample immediately after the sample EPR spectrum had been collected. The Cu spectra was run at a gain of 5.0×102. Each of the spectra were retrieved as an ASCII-text file, and all mathematical operations on the ASCII-text file were performed using Kaliedagraph (Synergy Software/Abelbeck Software). The baseline correction for a Co(II) spectrum was performed by fitting a linear baseline as described in Blackburn, *Spectral Analysis: Methods and Techniques*, 185–186 (1970), incorporated by reference herein. The fitted baseline was then subtracted from the original intensity value for the spectrum to generate the first derivative baseline corrected spectrum. This first derivative spectrum was integrated using the integration (curve) subroutine in Kaliedagraph to obtain the EPR absorbance spectrum. The area under the curve corresponding to the EPR absorbance spectrum was then determined by using the integration (area) subroutine in Kaliedagraph. This entire process was repeated for the Cu standard spectrum. The area under the EPR absorbance spectrum curve for the Cu standard was gain-corrected to the Co(II) sample. The spin density on the Co(II) sample was estimated by the ratio method based upon the known Cu and Co concentrations of the Cu standard and the Co sample respectively, as well as upon the gain-corrected areas. It was assumed that all of the Cu ions in the standard contributed to the standard's EPR spectrum. Simulations of the EPR spectra of the polymers were performed using Kaliedagraph. The ASCII-test files of the EPR spectra for the two referenced polymers were first spin density-quantified as described, then they were normalized to the Co spin density-quantified number corresponding to [P-1·pyridine(Co(II))]$^H$. A new ASCII-text file was set up next by taking the data points for each of the normalized reference spectra and multiplying it by a fraction, selected so that the sum of the fractions used was 1. These newly generated data points were then added together, and a combination ASCII-text file was generated. The simulated spectrum was prepared from this ASCII-text file and overlaid on the spectrum of [P-1·pyridine(Co(II))]$^H$, until they matched.

Figure 4:
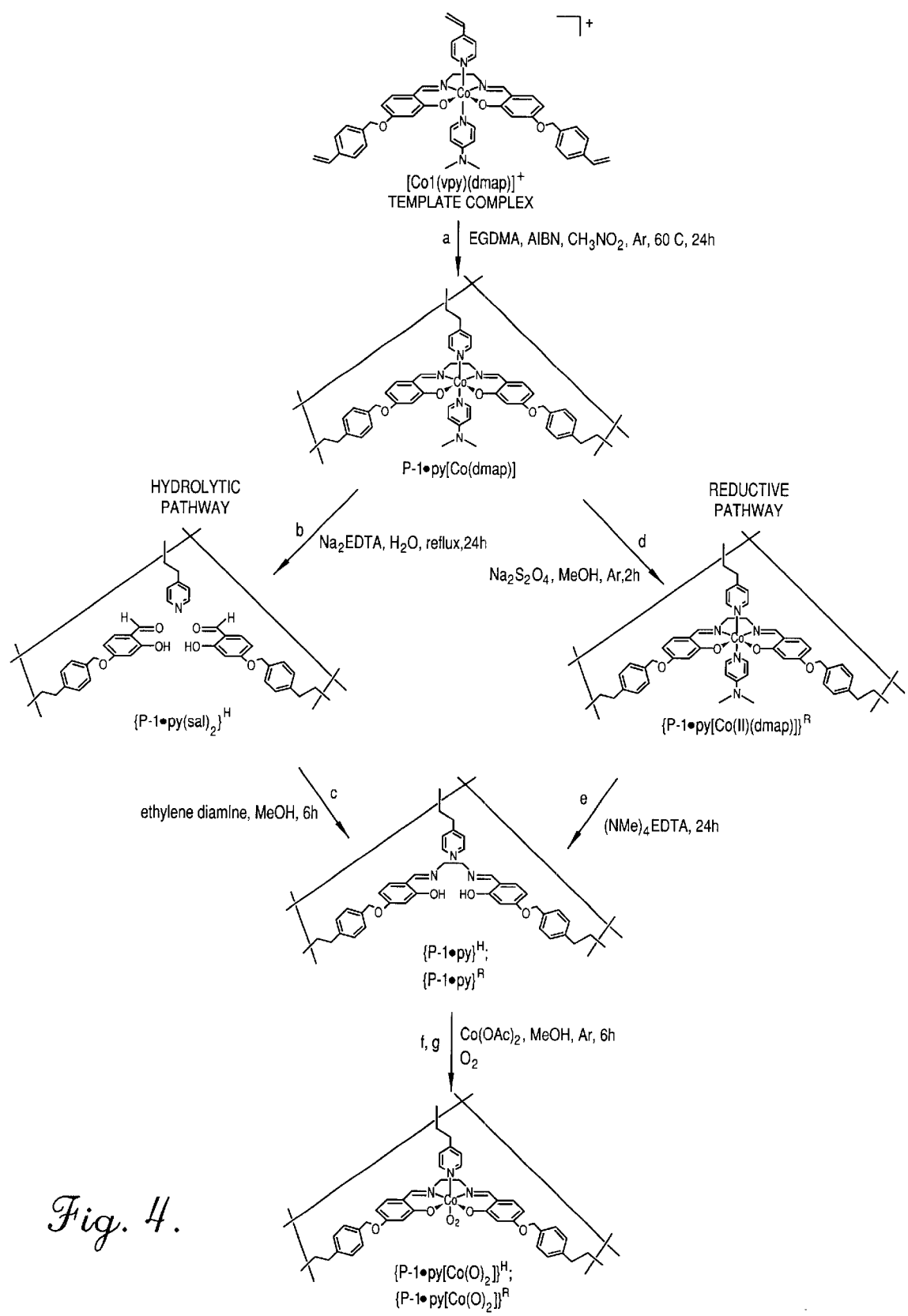
FIG. 4 illustrates the differences in the hydrolytic and reductive pathways, both of which can be used to form the composites of the invention.

Examples 2–14 below illustrate the preparation of one embodiment of the invention wherein the composite contains a Co ion bonded to styrene-modified salen ligands and two axially coordinated dimethylaminopyridine molecules which are immobilized in a methacrylate host. Examples 10 and 14 demonstrate the reversible binding of oxygen to these composites. Examples 7–9 explain the formation of the composite via the hydrolytic pathway while Examples 11–13 set forth the formation of the composite via the reductive pathway. The differences in these two pathways are illustrated in FIG. 4.

Figure 3:
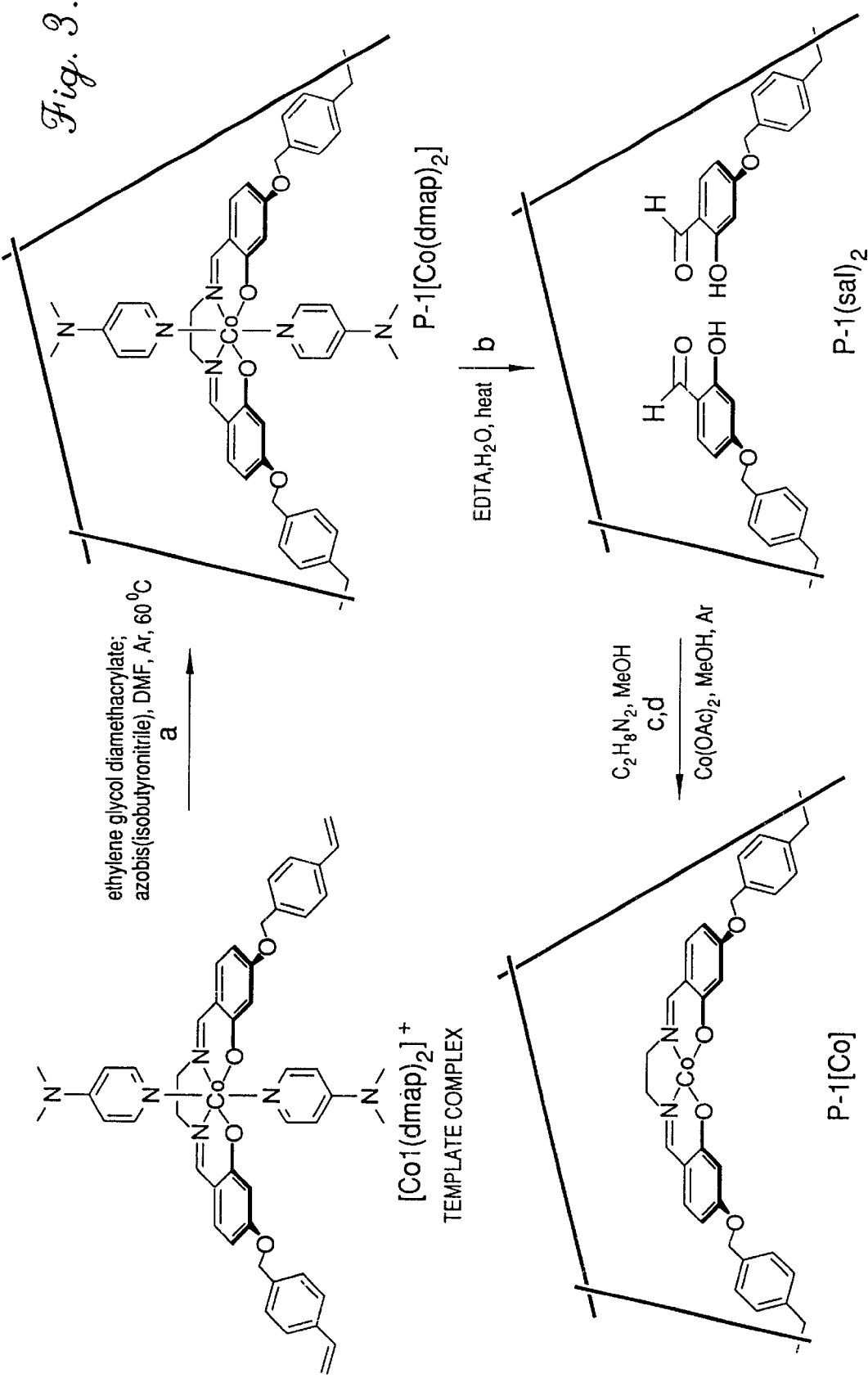
FIG. 3 shows the reactions carried out to immobilize the metal template complex into an organic host in accordance with one of the methods of the invention.

Examples 18 and 19 illustrate the preparation of a second embodiment of the invention, with Example 20 demonstrating the reversible binding of NO to the composite formed in Examples 18 and 19. FIG. 3 illustrates a simplified description of the formation of the composite of Examples 18 and 19, beginning with the polymerization with the template in the presence of a porogenic agent.

EXAMPLE 2

Preparation of 2-Hydroxy-4-(4-vinylbenzyloxy) benzaldehyde

The technique discussed in Daly et al., *J. Am. Chem. Soc.*, 83:4787–4792 (196 1), incorporated by reference herein, was followed to prepare 2-hydroxy-4-(4 vinylbenzyloxy) benzaldehyde with slight modifications. Specifically, 3.0 g (22.0 mmol) of 2,4-dihydroxy benzaidehyde were mixed with 3.310 g (22.0 mmol) of 4-vinyl benzyl chloride. The resulting mixture was dissolved in 40 ml of methanol and stirred continuously. A solution of 0.870 g (22.0 mmol) NaOH dissolved in 20 ml of methanol and 5 ml of distilled water was added to the mixture dropwise, resulting in the mixture immediately turning a bright yellow color. After the addition of the NaOH solution was complete, 0.870 g (55.0 mmol) of solid sodium iodide was added to the solution and stirring was commenced for 24 hours at 45° C. The reaction mixture was then allowed to cool to room temperature and stirred for an additional 48 hours, followed by removal of the volatiles under a reduced pressure of about 3 psi. The residue was extracted with 70 ml of ethyl acetate, washed three times with 50 ml portions of water, and washed twice with 30 ml portions of saturated NaCl solution. The ethyl acetate extract was dried over anhydrous sodium sulfate and the solvent was removed under a reduced pressure of about 3 psi. The dark, red-orange oily residue which contained unreacted 4-vinyl benzyl chloride was then kept under vacuum on a Schlenk line until a yellowish, solid residue appeared. This solid was washed with 15 ml of cold (about 0° C.) methanol and filtered through a medium porosity filter frit. The resulting solid was washed twice with 10 ml portions of ice-cold methanol and allowed to dry under vacuum to obtain 1.770 g (7.0 mmol, 32% yield) of 2-hydroxy-4-(4-vinylbenzyloxy)benzaldehyde.

Analytical Results on Final Sample:

1H NMR (CDCl$_3$) δ 6 5.10 (s, 2H, PhO—CH$_2$Ph), 5.28 (d, 1H, cis H(Ph)=CH$_2$), 5.78 (d, 1H, transH(Ph)=CH$_2$), 6.52 (d, 1H, ArH), 6.62 (dd, ArH), 6.72 (dd, 1H, H(Ph)=CH$_2$), 7.42 (br m, 5H, ArH), 9.71 (s, 1H, HCO(Ph)), 11.46 (s, 1H, —OH); and IR (KBr, cm$^{-1}$): 2820 (C—H, w), 1670 (sh), 1650 (sh), 1620 (sh) (CO, s), 1600 (sh), 1580 (C=C, s), 1540, 1510 (C—O—C, m).

EXAMPLE 3

Preparation of bis[2-Hydroxy-4-(4-vinylbenzyloxy)benzaldehyde]ethylenediimine Bis[2-hydroxy-4-(4-vinylbenzyloxy)benzaldehyde]ethylenediimine (hereinafter referred to as (1)) was prepared by suspending 1.0 g (3.933 mmol) of 2-hydroxy-4-(4 vinylbenzyloxy)benzaldehyde in 30 ml of dry methanol and stirred vigorously under nitrogen. Ethylenediamine (0.12 g, 2.0 mmol, 0.13 ml) was syringed into the suspension, quickly resulting in a bright yellow solution from which a yellow solid rapidly precipitated. This mixture was stirred for about 4 hours, and the yellow solid was isolated by filtering the mixture through a medium porosity filter frit. The yellow solid was extracted with 30 ml of chloroform, obtaining 0.97 g (1.8 mmol, 93% yield) of pure, bright yellow, crystalline bis[2-hydroxy-4-(4 vinylbenzyloxy)benzaldehyde]ethylenediimine by slow diffusion of diethyl ether into the chloroform extract.

Analytical Results on Final Sample: $^1$H NMR (CDCl$_3$) δ 6 3.84 (s, 4H, —CH$_2$CH$_2$), 5.04 (s, 4H, PhO—CH$_2$Ph), 5.26 (d, 2H, cis H(Ph)=CH$_2$), 5.75 (d, 2H, trans H(Ph)=CH$_2$), 6.46 (dd, 2H, salicyl phenyl ArH), 6.49 (d, 2H, salicyl phenyl Arl), 6.72 (dd, 2H, H(Ph)=CH$_2$), 7.09 (d, 2H, salicyl phenyl ArH), 7.39 (m, 4H, styryl phenyl ArH), 8.20 (s, 2H, N=CH), 13.62 (br s, 2H, OH); IR (nujol, cm$^{-1}$): 3436 (OH, b), 1642 (C=N, m), 1579, 1516 (m), 1168 (s); and FAB-MS (CH$_3$CN): m/z 533 (MH$^-$).

EXAMPLE 4

Preparation of the Template [Co(1)(4-Vinyl Pyridine)(N,N-Dimethyl Aminopyridine)]PF$_6$ The reaction for preparing [Co(1)(4-vinyl pyridine)(N,N-dimethyl aminopyridine)]PF$_6$ was carried out under argon in a drybox by dissolving 0.30 g (0.5632 mmol)ofbis[2-hydroxy-4-(4-vinylbenzyloxy)benzaldehyde]ethylenediimine and 0.0688 g (0.5632 mmol) of dimethylamino pyridine in 15 ml of dichloroethane, with the resulting suspension being stirred continuously. A solution containing 0.0997 g (0.563 mmol) of anhydrous cobalt (II) acetate in 5 ml of methanol was added to the suspension, resulting in a red-orange solution. Ferricenium hexafluorophosphate (0.1865 g, 0.5632 mmol) dissolved in 5 ml of acetonitrile was immediately added to the red-orange solution, resulting in a very dark brown solution. A solution containing 0.0594 g (0.563 mmol) of 4-vinyl pyridine in 5 ml of dichloromethane was added to the dark brown solution, with the resulting mixture being stirred for 1 hour. The reaction mixture was then removed from the inert atmosphere box, and the solvent was removed by rotoevaporation. The brown residue was extracted with five 10 ml portions of diethyl ether to remove the ferrocene generated during the reaction. The reaction mixture was then thoroughly extracted with two 20 ml portions of chloroform, and [Co(1)(4-vinyl pyridine)(N,N-dimethyl aminopyridine)]PF$_6$ was obtained by gradual diffusion of cyclohexane into the chloroform extract. The dark brown microcrystalline residue was isolated by filtering through a filter frit. The residue was then washed with cyclohexane and dried under vacuum to yield 0.42 g (0.44 mmol, 78% yield) of [Co(1)(4-vinyl pyridine)(N,N-dimethyl aminopyridine)]PF$_{6158}$ Analytical Results on Final Sample:

Anal. cald. for C$_{48}$H$_{49}$CoF$_6$N$_5$O$_5$P: C, 58.84; H, 5.04; N, 7.15; Co, 6.01. Found: C, 58.83; H, 4.91; N, 7.15; Co, 5.88; 1H NMR (CDCl$_3$) δ 6 2.93 (s, 3H, dmap CH$_3$), 2.95 (s, 3H, DMAP CH$_3$), 4.09 (m with two prominent peaks, 4H, —CH$_2$CH$_2$), 5.12 (s, 4H, PhO—CH$_2$Ph), 5.29 (d, 2H, stairwell cis H(Ph)=CH$_2$), 5.57 (dd, 1H, pyridyl cis H(Ph)=CH$_2$), 5,79 (d, 2H, stairwell trans H(Ph)=CH$_2$), 5.95 (dd, 1H, pyridyl trans H(Ph)=CH$_2$), 6.28 (m, 4H, salicyl ArH), 6.54 (m, 1H, pyridyl H(Ph)=CH$_2$), 6.75 (dd, 2H, stairwell H(Ph)=CH$_2$), 6.84 (s, 2H, salicyl ArH), 7.13 (m, 4H, 2 pyridyl ArH and 2 dmap ArH), 7.41 (m, 10H, 2 N=CH, and 8 ArH), 8.00 (m, 4H, 2 pyridyl ArH and 2 dmap ArH); UV-Vis (CHCl$_3$, $\lambda_{max}$ nm($\epsilon$, M$^{-1}$. cm$^{-1}$)) 257 (sh, 87420), 268 (104560), 316 (sh, 20570), 380 (12930), 459 (br sh, 2020); Diffuse Reflectance UV-Vis (1% in KBr, $\lambda_{max}$ nm) 264, 372, 470 (sh), 521; and Diffuse Reflectance IR (1% in KBr, cm$^{-1}$): 1624 (sh), 1615 (sh), 1606, 1542 (sh), 1527, 1144, 1126,845 (br s, PF$_6^-$).

EXAMPLE 5

Preparation of Host-Only Polymer P-1

The polymer P-1 was prepared in a sealed tube under argon by dissolving 1.0 g (99 mol %, 5.0449 mmol, 0.9516 ml) of ethylene glycol dimethacrylate (EGDMA) and 0.0084 g (1 mol %, 0.0510 mmol) of azobisisobutyronitrilev (AIBN) in 2.8548 ml (3.2473 g, 3:1 v/v with respect to EGDMA) of nitromethane. The resulting colorless mixture was then transferred into a thick-walled tube under argon, and the tube was tightly sealed with a Teflon® screwcap. The reaction tube was placed in an oil bath heated to 60° C., where it remained for 24 hours resulting in a milky white, highly crosslinked polymer. The nitromethane was removed under vacuum and the polymer P-1 was ground using a mortar and pestle. The ground polymer was then subjected to continuous extraction in methanol for 24 hours followed by drying under vacuum. The dried polymer was ground again and sieved to particle sizes of less than 125 pm. The host-only polymer P-1 (1.0003 g, nearly quantitative yield) had an average BET multi- point surface area of 310 m$^2$/g.

Analytical Results on Final Sample:

Diffuse Reflectance IR (15% in KBR, cm$^{-1}$): 2980 (sh), 2952, 2887 (sh), 1730, 1475(sh), 1453, 1255, 1162, 956, 880, 754.

EXAMPLE 6

Preparation of P-1·Pyridine[Co(N,N-Dimethyl Aminopyridine)]

This preparation was conducted in a sealed tube under argon by dissolving 0.30 g (5 mol %, 0.3119 mmol) of [Co(1)(4-vinyl pyridine)(N,N-dimethyl arninopyridine)]PF$_6$, 1.1623 g (94 mol %, 5.864×10$^{-3}$ mol, 1.106 ml) of EGDMA, and 0.0103 g (1 mol %, 6.24×10$^{-5}$ mol) of AIBN in 3.3180 ml (3.7774 g, 3:1 v/v ratio with respect to EGDMA) of nitromethane. The resulting mixture was placed in a thick-walled sealed tube under argon, and the tube was then tightly sealed with a Teflon® screwcap. The reaction mixture was then heated at 60° C. for 24 hours, at which point a highly crosslinked polymer had formed in the tube. The nitromethane was removed under vacuum, and the remaining deep red, insoluble P-1·pyridine[Co(N,N-dimethyl aminopyridine)] polymer was ground manually using a mortar and pestle. The resulting red-brown powder was subjected to continuous soxhlet extraction by methanol for 24 hours. The polymer was then dried under vacuum and sieved to particle sizes of less than 125 μm, resulting in 1.35 g (92% yield) of P-1·pyridine[Co(N,N-dimethyl aminopyridine)] having an average BET multi-point surface area of 230 m$^2$/g.

Analytical Results on Final Sample:

Anal. Calcd. for P-1·pyridine[Co(N,N-dimethyl aminopyridine)]: Co, 221 μmol/g; N, 1027 μmol/g. Found: Co, 180 μmol/g; and N, 1057 μmol/g. Diffuse Reflectance UV-Vis (20% in KBr, $\mu_{max}$ nm): 208 (s), 268 (s), 377 (m), 480 (br sh). Diffuse Reflectance IR (20% in KBr, cm$^{-1}$): 1630 (sh), 1623 (sh), 1609, 1533 (sh), 1526, 847 (intense, $PF_6^-$).

EXAMPLE 7

Hydrolysis of P-1·Pyridine[Co(N,N-Dimethyl Aminopyridine)] to [P-1·Pyridine(sal)$_2$]$^H$ P-1·pyridine[Co(,N-dimethyl aminopyridine)] polymer (0.30 g, containing 205 μmol of Co per gram of polymer) was placed into a 50 ml round bottom flask. Twenty ml of 0.10 M Na$_2$EDTA solution in deionized water was added to the flask, and the flask was fitted with a water condenser. The mixture was refluxed for 24 hours using a heating mantle. The mixture was then cooled, and the polymer settled to the bottom leaving a deep pink aqueous extract. The polymer was recovered by filtering the mixture through a medium porosity frit. The polymer was washed with five 5 ml portions of deionized water, followed by washings with two 3 ml portions of acetone. Finally, the polymer was washed with two 3 ml portion of diethyl ether and dried under vacuum for 6 hours to yield (nearly quantitatively) 0.2955 g of polymer [P-1·pyridine(sal)$_2$]$^H$, where "sal" represents salicylaldehyde. N analysis and Diffuse Reflectance IR Spectra of the resulting polymer indicated that the Salen backbone had been hydrolyzed to the salicylaldehyde moiety.

Analytical Results on Final Sample:

Anal. Calcd. for [P-1·pyridine(sal)$_2$]$^H$: Co, 0 μmol/g; N, 698 μmol/g (after factoring the contribution from residual Co(III) sites). Found: Co, 40 μmol/g; N, 643 μmol/g; Diffuse Reflectance UV-Vis (20% in KBr, $\lambda_{max}$ nm): 213 (s), 276 (s), 309 (sh), 384 (sh), 492 (br sh); and Diffuse Reflectance IR (20% in KBr, cm$^{-1}$): 1654 (sh), 1648 (sh), 1639 (sh), 1630, 1609 (sh), 1580 (sh), 1520 (sh), 847 (w, residual $PF_6^-$).

EXAMPLE 8

Preparation of (P-1·Pyridine)$^H$

[P-1·pyridine(sal)$_2$]$^H$ (0.250 g) was placed into a sample vial with a magnetic stir bar. MeOH (10 ml) was added and 0.055 ml (0.0493 g, 0.82 mmol) of ethylene diamine was syringed into the vial. The resulting mixture was stirred for 6 hours, and the polymer was filtered through a medium porosity frit. The polymer was then washed with two 3 ml portions of MeOH followed by a washing with two 3 ml portions of ether and drying under vacuum for 6 hours, yielding (nearly quantitatively) 0.2505 g of pale yellow (P-1·pyridine)$^H$. N analysis and Diffuse Reflectance IR Spectra of the polymer indicated that the salen backbone had been reformed.

Analytical Results on Final Sample:

Anal. Calcd. for (P-1·pyridine)$^H$: Co, 0 μmol/g; N, 698 μmol/g (after factoring the contribution from residual Co(III) sites). Found: Co, 41 μmol/g; N, 771 μmol/g; Diffuse Reflectance UV-Vis (20% in KBr, $\lambda_{max}$ nm): 208 (s), 280 (s), 309 (sh), 371 (sh), 494 (br sh); and Diffuse Reflectance IR (20% in KBr, cm$^{-1}$): 1629, 1598 (sh), 1581 (sh), 1515 (sh), 849 (w, residual $PF_6^-$).

EXAMPLE 9

Preparation of [P-1Pyridine(Co(II))]$^H$

This procedure was carried out in a drybox by placing 0.20 g of (P- 1·pyridine)$^H$ into a sample vial containing a stir bar. Ten ml of a solution containing 0.01 M Co(OAc)$_2$ in dry methanol was added to the polymer, and the resulting mixture was stirred for 8 hours. The polymer was filtered through a medium porosity frit, washed with three 5 ml portions of methanol, washed with two 3 ml portions of ether, and dried under vacuum for 2 hours. The polymer was then transferred to a soxhlet extractor assembled in the drybox. The polymer was subjected to continuous extraction with methanol under nitrogen for 24 hours. The assembly was then taken back into the drybox, and the polymer was isolated and dried under vacuum for 6 hours resulting in 0.1920 g (95% yield) of dark orange polymer [P-1·pyridine (Co(II))]$^H$.

Analytical Results on Final Sample:

Anal. Calcd. for [P-1·pyridine(Co(II))]$^H$: Co, 205 μmol/g; N, 615 μmol/g. Found: Co, 184 μmol/g; N, 693 μmol/g; Diffuse Reflectance UV-Vis (20% in KBr, $\lambda_{max}$ nm): 211 (s), 261 (sh), 354 (br sh), 475 (br sh), 690 (w br sh); Diffuse Reflectance IR (15% in KBr): 1635 (sh), 1606, 1559 (w), 1521, 847, (w, residual $PF_6^-$); Average Surface Area (BET): 280 m$^2$/g; and EPR (ether suspension, 77° K): tetracoordinated sites: $g_{\parallel}$=2.82 and $g_{\perp}$1.93. pentacoordinated sites: $g_1$=2.48; $g_2$=2.25; and $A_3$=99G.

EXAMPLE 10

Reversible Oxygen Binding to [P-1·Pyridine(Co(II))]$^H$

Pure, dry oxygen was purged through an EPR sample tube containing an ether suspension of [P-1·pyridine(Co(II))]$^H$ for 35 minutes at room temperature followed by freezing of the purged sample in liquid nitrogen. An X-band EPR spectrum of the sample was collected at 77° K and a characteristic Co-superoxo signal was observed indicating the formation of [P-1·pyridine(Co(O$_2$))]$^H$. About 10% of the original tetracoordinated Co(II) sites were also present as evidenced by the characteristic feature at g=1.93. This Co-superoxo signal quantified to 80% of the total Co content in the polymer. The superoxo signal was seen at 70% of its initial intensity 25 days after its generation, indicating that the sites are isolated from one another, and the polymer is acting as a robust host. Pure, dry nitrogen gas was then purged through the EPR tube for 35 minutes, and an EPR spectrum was collected (ether suspension, 77K). The spectrum was characteristic of Co(II) sites in [P-1·pyridine(Co (II))]$^H$ and showed that it had reformed. Spin density quantification indicated that the Co-superoxo signal corresponded to 90% of the total Co content in the polymer. This cycling between [P1·pyridine(Co(O$_2$))]$^H$ and [P-1·pyridine(Co(II))]$^H$ was repeated several times with about 80% of the original superoxo signal intensity seen at the sixth cycle.

EXAMPLE 11

Reduction of P-1·Pyridine[Co(N,N-Dimethyl Aminopyridine)] to P-1·Pyridine[Co(II)(N,N-Dimethyl Aminopyridine)]$^R$ In this experiment, 0.30 g of P-1·pyridine[Co(N,N-dimethyl aminopyridine)] polymer (containing 180 μmol of Co per gram of polymer) was placed into a small sample vial equipped with a magnetic stir bar. The polymer was treated under argon with 10 ml of a saturated methanolic solution of sodium dithionite (85%, tech. grade). The resulting mixture was stirred for 2 hours, and the polymer was separated by filtering the mixture through a medium porosity filter frit. The polymer was then washed with methanol and diethyl ether and dried under vacuum to obtain the reduced polymer P-1·pyridine[Co(II)(N,N-dimethyl aminopyridine)]$^R$. The polymer was subjected to continuous extraction, under nitrogen, with methanol in a soxhlet extractor followed by drying in an inert atmosphere, resulting in 0.299 g of brown-orange P-1·pyridine[Co(II)(N,N-dimethyl aminopyridine)]$^R$. Approximately 90% of the Co sites in the P-1·pyridine[Co(N,N-dimethyl aminopyridine)] were reduced by this method, as indicated by EPR spectroscopy.

EXAMPLE 12

Preparation of (P-1·Pyridine)$^R$

This preparation was performed in an inert atmosphere box by stirring a suspension of P-1·pyridine[Co(II)(N,N-dimethyl aminopyridine)]$^R$ in 10 ml of 0.02 M $(NM_4)_2$ EDTA solution for 24 hours, after which the polymer was obtained by filtering the resulting mixture through a medium porosity filter frit. The resulting yellowish-brown apo (metal-free) polymer (P-1·pyridine)$^R$ was washed thoroughly with methanol and ether, and then dried under vacuum to obtain 0.2401 g of the polymer (P-1·pyridine)$^R$.

Analytical Results on Final Sample:

Anal. Calcd. for (P-1·pyridine)$^R$: Co, 0 $\mu$mol/g; N, 654 $\mu$mol/g. Found: Co, 28 $\mu$mol/g; N, 678 $\mu$mol/g; Diffuse Reflectance UV-Vis (20% in KBr, $\lambda_{max}$ nm): 223 (s), 265 (s), 382 (sh), 483 (br sh); Diffuse Reflectance IR (20% in KBr): 1625 (sh), 1609, 1523, 848 (w, residual $PF_6^-$);

EXAMPLE 13

Preparation of [P-1·Pyridine(Co(II))]$^R$

In this preparation, 0.20 g of (P-1·pyridine)$^R$ was suspended under argon in 10 ml of a solution containing 0.02 M Co(OAc)$_2$ in methanol. The resulting mixture was stirred for 8 hours and filtered through a medium porosity frit in order to obtain the dark orange-brown solid [P-1·pyridine (Co(II))]$^R$. The [P-1·pyridine(Co(II))]$^R$ was purified by continuous extraction with methanol under nitrogen for 24 hours, followed by drying under vacuum. This resulted in the isolation of 0.2004 g of [P-1·pyridine(Co(II))]$^R$ having 180 $\mu$mol of Co per gram of polymer.

Analytical Results on Final Sample:

Anal. Calcd. for [P-1·pyridine(Co(II))]$^R$: Co, 180 $\mu$mol/g; N, 654 $\mu$mol/g. Found: Co, 171 $\mu$mol/g; N, 621 $\mu$mol/g; Diffuse Reflectance UV-Vis (15% in KBr, $\lambda_{max}$ nm): 221 (sh), 268 (s), 379 (sh), 472 (br sh), 633 (w br sh); Diffuse Reflectance IR (15% in KBr, cm$^{-1}$): 1653 (w), 1635 (sh), 1606, 1539 (w), 1521, 1506 (w), 848 (w, residual $PF_6^-$); Average Surface Area (BET): 270 m$^2$/g; and EPR (ether suspension, 77° K): tetracoordinated sites: $g_\parallel$=2.83 and $g_\perp$=1.94 pentacoordinated sites: $g_1$=2.44; $g_2$=2.25; and $A_3$=103G.

EXAMPLE 14

Reversible Oxygen Binding to [P-1·Pyridine(Co(II))]$^R$

Pure, dry oxygen was purged through an EPR sample tube containing an ether suspension of [P-1·pyridine(Co(II))]$^R$ for 25 minutes at room temperature and frozen in liquid nitrogen. An X-band EPR spectrum of the sample was collected at 77° K and a characteristic Co-superoxo signal was observed indicating the formation of [P1·pyridine(Co (O$_2$))]$^R$. This Co-superoxo signal quantified to 90% of the total Co content in the polymer.

Pure, dry nitrogen gas was then purged through the EPR tube for 30 minutes and an EPR spectrum was collected (ether suspension, 77° K). The spectrum was characteristic of Co(II) sites indicating that [P-1·pyridine(Co(II))]$^R$ was reformed. Spin density quantification indicates that this signal corresponded to 90% of the total Co content in the polymer. [P-1·pyridine(Co(O$_2$))]$^R$ was regenerated by purging the EPR sample tube containing [P-1·pyridine(Co(II))]$^R$ for 25 minutes with oxygen. Quantification of the spin density of the regenerated [P-1·pyridine(Co(O$_2$))]$^R$ X-band EPR spectrum indicated that this signal corresponded to 86% of the total Co content in the polymer.

EXAMPLE 15

Preparation of [P-1·Pyridine(Fe(II))]$^H$

In preparing [P-1·pyridine(Fe(II))]$^H$, 0.30 g of (P-1·pyridine)$^H$ was weighed out into a sample vial (having a stir bar) and transferred into a drybox. Next, 0.0174 g of iron acetate (Fe(Oac)$_2$) was added to the vial containing the polymer. Seven ml of acetonitrile was pipetted into the vial, and the resulting mixture was stirred for 24 hours to obtain a light red-brown slurry. The polymer was filtered through a medium porosity flit and stirred with 5 ml of acetonitrile for 6 hours to remove any excess Fe(Oac)$_2$. [P1·pyridine(Fe (II))]$^H$ polymer (0.3005 g, nearly a quantitative yield) was obtained by filtering the polymer-containing solution through a medium porosity frit, followed by three washings with 3 ml aliquots of ether and drying. The Fe content of the polymer was 180 $\mu$mol of Fe per gram of polymer.

EXAMPLE 16

Preparation of [P-1·Pyridine(Fe(III))]$^H$

In this preparation, 0.0121 g of [P-1·pyridine(Fe(II))]$^H$ was weighed out into an EPR tube in a drybox, with 0.4 ml of acetonitrile being added to the tube to form a suspension of polymer in acetonitrile. The tube was tightly sealed with a septum, and pure, dry oxygen was bubbled through the tube for 15 minutes. The polymer changed color to deep red. An EPR spectrum of the polymer was collected at 77° K, and it indicated that the Fe had been oxidized and was now in a Fe$^{+3}$ high-spin, rhombic state.

EXAMPLE 17

Preparation of [P-1·pyridine(Mn(II))]$^H$

In this preparation, 0.30 g of [P-1·pyridine]$^H$ was weighed out into a sample vial in a drybox, and a stir bar was added. Next, 0.025 g of manganese triflate (Mn(Otf)$_2$) was added followed by the addition of 7 ml of acetonitrile. The polymer suspension was stirred for 24 hours to obtain a light, yellowish-brown slurry. The suspension was filtered through a medium porosity frit to obtain the polymer, which was washed thoroughly with acetonitrile, washed with ether, and dried. This preparation resulted in 0.3004 g of [P-1·pyridine (Mn(II))]$^H$ being obtained in a nearly quantitative yield. The Mn content of the polymer was 171 $\mu$mol of Mn per gram of polymer (calcd. 205 $\mu$mol/g).

EXAMPLE 18

Preparation of the Template [Co(1)(N,N-Dimethyl Aminopyridine)$_2$]PF$_6$

This preparation was conducted in a dry box under an argon atmosphere by partially dissolving 0.991 g (1.86 mmol) of (1) in 30 ml of 1,2-dichloroethane to give a yellow ligand suspension. Methanolic Co(OAc)$_2$ (0.329 g, 1.86 mmol) solution (10 ml) was added to the suspension and stirring was commenced. The reaction mixture became orange in color and an orange precipitate began to form after about five minutes. A solution containing 0.445 g (3.72 mmol) of 4-dimethylaminopyridine dissolved in 10 ml of methanol was added to the mixture, with no appreciable color change being observed. Ferrocenium hexafluorophosphate (0.616 g, 1.86 mmol) was partially dissolved in 30 ml of methanol yielding a deep blue solution that was then added to the reaction mixture. After approximately 1 hour, the color of the reaction mixture changed from orange to a deep reddish-brown. The reaction was then stirred for an additional 12 hours after which volatiles were removed under reduced pressure to yield a brown solid. This solid was then filtered and washed with diethyl ether until the diethyl ether ran clear. The resulting reddish-brown solid was then washed three times with a 3:1 diethyl ether:methanol solution and twice with diethyl ether. The resulting [Co(1)(N,N-dimethyl aminopyridine)$_2$]PF$_6$ (with 1.683 g being obtained, a 92% yield) was dried under vacuum overnight.

Analytical Results on Final Sample:

Anal. Calcd. for [Co(1)(N,N-dimethyl aminopyridine)] PF$_6$, C$_{48}$H$_{50}$CoF$_6$N$_6$O$_4$P: C, 58.9 %; H, 5.15 %; N, 8.59 %. Found: C, 58.93 %; H, 5.06 %; N, 8.25 %; $^1$H NMR (CDCl$_3$) δ 7.88 (s, 2H, —N=CH(Ph)), 7.47 (d, 4H, dmapH), 7.43 (d, 4H, styryl phenyl), 7.38 (d, 4H, styryl phenyl), 7.07 (d, 2H, salicyl phenyl), 6.82 (d, 2H, salicyl phenyl), 6.72 (dd, 2H, 10.9 Hz, H(Ph)C=CH$_2$), 6.29 (d, 4H, dmaph), 6.24 (dd, 2H, 2.4 Hz, salicyl phenyl), 5.76 (d, 2H, trans H(Ph)C=CH$_2$), 5.26 (d, 2H, cis H(Ph)C=CH$_2$), 5.02 (s, 4H, PhO—CH$_2$Ph), 4.01 (s, 4H, —CH$_2$CH$_2$—), 2.93 (s, 12H, dmap-NCH$_3$); UV-Vis (CH$_2$Cl$_2$, λ$_{max}$/nm (ε, M$^{-1}$ cm$^{-1}$)): 234 (56700), 271 (109000), 380 (11600); and IR (KBr): 3088 (w), 2924 (w), 2867 (w), 1625 (s), 1604 (s), 1527 (m), 1482 (w), 1430(m), 1388(m), 1306(w), 1263(w), 1226(s), 1180(m), 1143 (m), 1123 (m), 1063 (m), 1020 (m), 950 (w), 916 (w), 840 (bs) cm$^{-1}$.

EXAMPLE 19

1. Preparation of P-1[Co(N,N-Dimethyl Aminopyridine)$_2$] PF$_6$)

The polymers were synthesized using 5 mole % of metal complex, 94 mole % of crosslinking agent, 1 mole % of initiator, and 3:1 v/v ratio of porogenic agent:crosslinking agent. During the preparation described below, all reagents were added to a high pressure glass reaction tube (Ace) and sealed with a screw cap under an argon atmosphere.

In preparing P-1[Co(N,N-dimethyl aminopyridine)$_2$] (PF$_6$), the complex [Co(1)(N,N-dimethyl aminopyridine)$_2$] (PF$_6$) prepared in Example 18 (0.660 g, 0.674 mmol) was added to the reaction tube and approximately ⅔ of the DMF (total DMF: 7.599 g, 104 mmol, 7.173 ml) was added to the tube. The remaining reagents were not added until the complex was completely dissolved. EGDMA (2.676 g, 13.5 mmol) and AIBN (0.0235 g, 0.143 mmol) were then added to the tube using the remaining DMF. The tube was then sealed, and the reaction mixture was placed in an oil bath at 60° C. for 24 hours. The DMF was then removed under vacuum, and the polymer was ground using a mortar and pestle. The ground polymer was then placed into a fluted #41 (110 mm, ashless) filter paper, placed in a Soxhlet apparatus, and washed with methanol for 24 hours. The resulting polymer was then dried under vacuum and ground and sieved to particle sizes of ≦125 μm (115 mesh), resulting in 2.812 g of the reddish-brown polymer.

Analytical Results On Final Sample:

Co=180 μmol Co/g polymer (average value); Nitrogen analysis: 1.64% found; 1.40% calculated; 1.61% calculated and corrected (the correction factor, 0.21%, is the average nitrogen content of three different samples of "complex-free" poly(EGDMA); and Fluoride analysis: 1.68% found; 1.89% calculated.

2. Preparation of P-1(sal)$_2$

In this preparation, 1.055 g of the polymer P-1[Co(N,N-dimethyl aminopyridine)$_2$](PF$_6$) prepared in part 1 was treated with 50 ml of 0.1 M Na$_2$EDTA in deionized water. The reaction mixture was then refluxed for 24 hours. The polymer was filtered and washed five times with 5 ml aliquots of deionized water, three times with methanol, and three times with diethyl ether. The polymer was then dried under vacuum resulting in 1.207 g of the light tan polymer.

Analytical Results On Final Sample:

Co=0.0024 μmol Co/g polymer; Nitrogen analysis: 0.17% found; 0.04% calculated; 0.25% calculated and corrected; and Fluoride analysis: 0.05% found; 0.05% calculated.

3. Preparation of the Polymer P-1

In this preparation, 1.127 g of the P-1(sal)$_2$ polymer prepared in part 2 was added to a 100 ml single neck flask fitted with a septum. The polymer was degassed three times by successively applying a vacuum and refilling with nitrogen. Ten milliliters of freshly distilled methanol was syringed into the flask. One equivalent of ethylenediamine (15.1 μl, 225 μmol, based on cobalt analysis of P-1[Co(N,N-dimethyl aminopyridine)$_2$](PF$_6$)) was added, and the mixture was stirred for six hours. The polymer was filtered and washed three times with diethyl ether and dried under vacuum for 15 minutes to yield 0.9413 g of the yellowish-tan polymer.

Analytical Results On Final Sample:

Nitrogen analysis: 0.76% found; 0.43% calculated; 0.64% calculated and corrected.

4. Preparation of [P-1·(Co(II))]

In this preparation, 0.901 g of the polymer P-1 prepared in part 3 was placed in a Schlenk tube and degassed by applying a vacuum and refilling with nitrogen three times. The polymer was then treated with 10 ml of a 0.1 M Co(OAc)$_2$ solution under an argon atmosphere, followed by stirring of the mixture for six hours. The polymer was then filtered into a fluted Whatman #41 (90 mm, ashless) filter paper and placed in a glass thimble (with coarse frit). The polymer was then washed in a Soxhlet apparatus with methanol for 14 hours and dried under vacuum, resulting in 0.294 g of the orange-red polymer. The resulting polymer had an average of 173 μmol Co/g polymer.

EXAMPLE 20

Reversible NO Binding to [P-1·(Co(II))]

Figure 5:
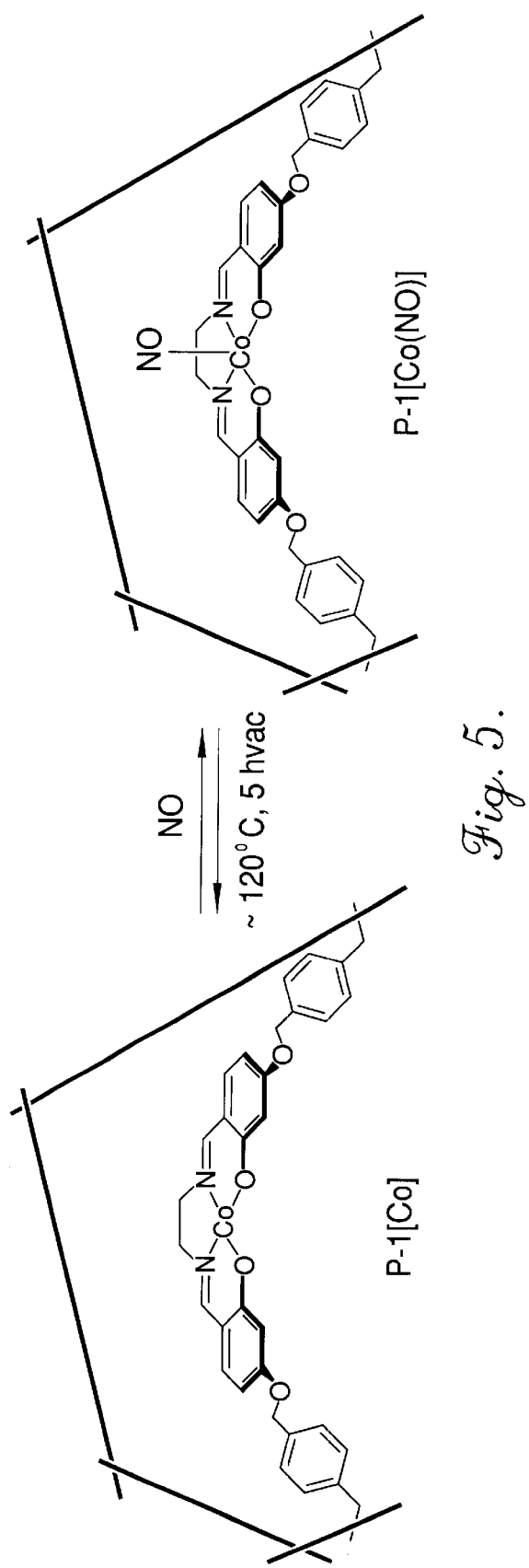
FIG. 5 schematically depicts NO bonded to the metal ion in one embodiment of the invention.

A quantity of [P-1·(Co(II))] (prepared as described in Example 19) was contacted with NO at room temperature in an oxygen-free environment. FIG. 5 illustrates the binding of NO to the Co ion. In order to release the NO from the composite, the NO-containing composite was heated under vacuum to a temperature of about 120° C. The reaction was monitored by diffuse reflectance optical spectroscopy, fluorescence spectroscopy, and EPR spectroscopy, the results of which are depicted in FIGS. 6, 7, and 8, respectively. Referring to FIG. 7, it can be seen that the fluorescence spectrum was quenched upon NO binding. The EPR spectra (FIG. 8) was taken prior to NO binding (solid line), with NO bound to the cobalt centers of the polymer (dashed line), and after removal of NO from the polymer (dotted line). The spectrum after removal of NO from the polymer was nearly identical to the spectrum of the sample prior to NO binding providing evidence of the reversibility of the NO binding.

We claim:

1. A stable composite comprising:
   a polymer matrix in the form of an amorphous structure having a plurality of channels;
   a metal ion; and
   a ligand bonded to said metal ion and to said polymer matrix,
      said metal ion being immobilized in said composite and being at least about 8 Å from any other metal ion in said composite.

2. The composite of claim 1, wherein said metal ion is an ion of a transition metal.

3. The composite of claim 2, wherein said metal ion is a Co(III) ion.

4. The composite of claim 1, wherein said channels have an average diameter of from about 60–120 Å.

5. The composite of claim 1, wherein said polymer is crosslinked and comprises a plurality of monomers, at least certain of said monomers having a vinyl group.

6. The composite of claim 1, wherein said polymer is crosslinked and is formed of monomers selected from the group consisting of divinyl benzene, dimethacrylates, diacrylamides, and mixtures thereof.

7. The composite of claim 1, wherein said composite includes from about 5–20% by weight of said metal ion, based upon the total weight of the composite taken as 100% by weight.

8. The composite of claim 1, wherein said ligand comprises a styrene-modified salen ligand.

9. The composite of claim 1, further including a species bonded to said metal ion, said species being selected from the group consisting of oxygen, carbon monoxide, carbon dioxide, compounds having an atom of P, S, or N, and mixtures thereof.

* * * * *